2,853,481
AZO DYESTUFFS

Albert F. Strobel, Phillipsburg, N. J., and William W. Williams, Easton, Pa., assignors to General Aniline & Film Corporation, New York, N. Y., a corporation of Delaware No Drawing. Application December 30, 1954
Serial No. 478,874

7 Claims. (Cl. 260—147)

The present invention relates to the production of novel azo dyestuffs having the formula

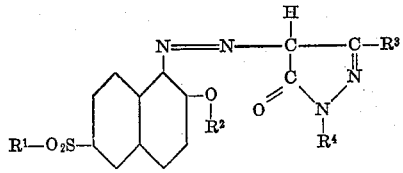

and the metal complexes of such dyestuffs having the formula

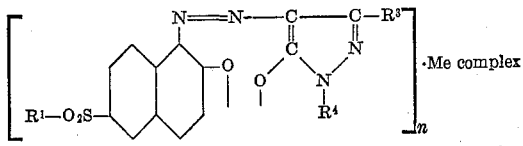

wherein $R^1$ is selected from the group consisting of lower alkyl, amino, monoalkylamino, dialkylamino, hydroxyalkylamino, dihydroxyalkylamino, morpholino, and piperidino; $R^2$ is lower alkyl; $R^3$ is selected from the group consisting of lower alkyl, carbalkoxy, and carbonamide; $R^4$ is selected from the group consisting of H, alkyl, hydroxyalkyl, cyanoalkyl, and monocyclic aromatic radicals; Me is a metal selected from the group consisting of chromium, nickel, and copper, and $n$ has a value of 1 to 2.

Azo dyestuffs derived from the known coupling components and diazo components containing sulfamyl substituents are well known in the prior art. Such dyestuffs are usually employed in metallized form and generally contain free sulfonic acid groups, the function of which is principally to impart some degree of water solubility when dyeing wool, nylon and similar fibrous material. However, most dyes having free sulfonic acids groups have the disadvantage that they do not exhaust well from a neutral dyebath. When they are applied from a weakly acidic dyebath, the sulfonated metallized monoazo dyes often produce unlevel dyeings. Further, the wash fastness and light fastness properties of dyeings made with these dyestuffs have not been found to be completely satisfactory. The instant invention is based upon the discovery that dyestuffs devoid of carboxylic and sulfonic acid groups of the above formulae have surprisingly improved properties rendering them highly desirable and superior for commercial use. Thus, it has been found that the compounds of this invention yield bright pink to red shades having exceptionally good light fastness and wash fastness on wool and nylon, in addition to having superior level dyeing properties.

The dyestuffs of this invention may be readily prepared in known manner by diazotizing a compound of the formula:

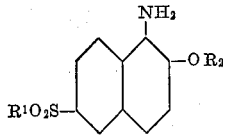

and coupling the diazotized compound with a pyrazolone of the formula:

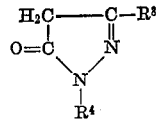

wherein $R^1$, $R^2$, $R^3$ and $R^4$ have the values given above. It is to be pointed out that the compounds of this invention cannot be made by diazotization of a 1-amino-2-naphthol compound ($R^2$ is H) since it has been found that such a compound decomposes to a quinone during treatment in the usual diazotizing medium. This problem was solved by employing as the diazo component precursor a 1-amino-2-alkoxynaphthalene compound, which diazotizes readily in the desired manner.

In the above formulae, $R^1$ may be methyl, ethyl, amino, monomethylamino, monoethylamino, dimethylamino, diethylamino, hydroxyethylamino, di(hydroxyethyl)amino, morpholino or piperidino or the like; $R^2$ may be methyl, ethyl or the like; $R^3$ may be methyl, ethyl, carbethoxy, carbomethoxy, carbonamide or the like; and $R^4$ may be H, methyl, ethyl, propyl, isopropyl, hydroxyethyl, cyanoethyl, phenyl, or phenyl substituted with non-water solubilizing groups (e. g. 3'-sulfamyl phenyl-, 2',5'-dichlorophenyl-, 3'-N,N-dimethylsulfamylphenyl-, 4'-N-hydroxyethylsulfamylphenyl-, 2'-methoxy-4'-sulfamylphenyl-) or the like.

The azo dyestuffs of the above formula may then be treated with an agent yielding chromium, nickel and/or copper in order to produce the corresponding metal complexes of the dyestuffs. The metallization is carried out under such conditions that the lower alkyl group $R^2$ is split off during the metallization. Higher temperatures are required to bring about the de-alkylative metallization than for the metallizing of o,o'-dihydroxy azo dyestuff, and in this high temperature metallizing process, only agents yielding chromium, nickel and/or copper have been found to be operative. In general, when metallizing with chromium compounds, temperatures of from about 140° to 180° C., and preferably from about 145 to 175° C. are required. When metallizing with agents yielding nickel or copper, temperatures of from about 110° to 125° C. are required. The metallization may be carried out in acid, neutral or alkaline media. Since the azo dyestuffs to be metallized are substantially water-insoluble, the use of organic solvents such as formamide, dimethyl formamide, acetamide isopropanol, ethanol or the like as the metallizing medium is preferred. It will be understood that when low boiling solvents are employed, the metallization must be carried out under pressure in view of the temperatures required therefor. The metallizing agents may be applied in the form of their oxides, hydroxides or salts, as for example, with inorganic or organic acids such as hydrochloric, sulfuric, hydrofluoric, formic, acetic, tartaric, salicylic, or the like. The metallizing agent may be used alone or in the presence of an additional substance which may or may not form a complex compound with the metallizing agent, as for example, ammonia, pyridine, ethylene diamine, ethanolamine, formamide, formic acid, acetic acid, oxalic acid, aliphatic and aromatic hydroxy-containing compounds such as alcohol, glycerin, aliphatic hydroxy carboxylic acids such as tartaric, lactic and citric acids and the like, aromatic hydroxy carboxylic acids such as salicylic acid and the like, sugars, cellulose derivatives, phenols, tannins and lignins and the like, soluble salts of sulfonic acids and carboxylic acids of the aliphatic, aromatic and hydroaromatic series, inorganic metal, alkali metal and alkaline earth metal salts, oxides and hydroxides and the like. Dispersing agents, solvents, and other assistants may also be employed in the metallizing process.

The metallization may be conducted with one or several metallizing agents simultaneously or successively to yield mixed metalliferous complex azo compounds in accordance with this invention. The metallizing agent may be applied in such manner that the resulting complex compound of the azo dyestuff contains less than one atom or an amount substantially equivalent to one atom of metal. Thus, the resulting metalliferous complex compound may represent the complex union of one atom of metal with from one to two molecules of the azo dyestuff, depending upon the valence and complex-forming characteristics of the metal, the reaction conditions and the like. For example, when one mole of azo dyestuff is treated with one molecular equivalent of complex-forming metal, the reaction product probably comprises a mixture of products wherein one atom of metal is bound to from one to two dyestuff molecules, with the excess metal acting as a reaction catalyst. It will accordingly be understood that the structural formulae of specific metal complexes employed in the examples below and in the appended claims cover such a mixture of products. Products containing one atom of metal and two molecules of the azo dyestuff are preferred.

It will be readily understood that in the production of the dyestuffs of this invention as above described, diazotization and/or coupling and/or metallization may be carried out in substance, on a substratum or in situ. These dyestuffs may be employed for coloring (dyeing, printing, pigmenting, etc.) in bulk, on the fiber, and the like. Since the metal complexes are substantially water-insoluble pigment-like products, they are preferably converted to dispersed form for application to textile fibers from an aqueous dyebath. This method of coloring is particularly suitable for the chromium complexes which are relatively more soluble than the nickel and copper complexes. The dispersion of these insoluble products may be carried out by mixing the metallized dye with at least an equal amount of a suitable dispersing agent, such as a naphthalene-formaldehyde sulfonic acid condensation product, and kneading the mixture in a Werner-Pfleiderer mixer for several hours. Excellent results may be obtained when applying such dispersed dyestuffs from a neutral or slightly acid aqueous bath to wool or nylon. The dyestuffs may also be employed for coloring other material such as silk, leather, mixed fibers, natural or synthetic materials in bulk, film, or fiber form such as cellulose esters and ethers, Orlon, Dacron, Dynel, Acrilan, Aralac, or the like. They may also be employed for coloring or pigmenting natural or artificial resins or plastics in bulk, organic solvents, stains, varnishes, lacquers, and the like.

The following examples are illustrative of the instant invention and are not to be regarded as limitative.

*Example 1*

Preparation of—

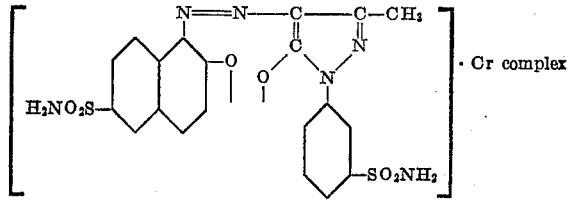

A. Preparation of the intermediate:

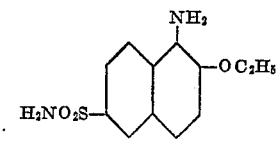

(1) 289 g. of 1-amino-2-ethoxynaphthalene (1.5 moles, =97%) and 600 ml. acetic anhydride was mixed, cooling to 15–20° C. The mixture was stirred 30 minutes, then heated to 80° C. and maintained at this temperature 1 hour, after which it was cooled to 10° C. and drowned in 1800 ml. water. The slurry was heated to 80° C., and stirred at this temperature for 1 hour. It was then filtered, washed with 2 liters water, and dried to give 300 g. dry material.

(2) 190 g. of the latter product (1-acetylamino-2-ethoxynaphthalene) was dissolved in 1500 ml. dry chloroform, then cooled to 0° C. 950 g. chlorosulfonic acid was added dropwise over a 2 hour period keeping the material at 0° C. After the addition, the material was stirred 45 minutes, then drowned in 4500 g. ice-water slush. Total volume=12 liters. The precipitate was then filtered, washed with ice-water. Presscake weight= 390 g.

(3) 390 g. of above wet presscake (1-acetylamino-2-ethoxy-6-naphthalenesulfonyl chloride) was then intimately mixed with 340 g. of ammonium carbonate, then allowed to stand overnight. In the morning 2300 ml. water was added. The mixture was stirred 3 hours at 80° C., then cooled to 15° C., filtered and washed with 1000 ml. water. The presscake was reslurried and washed with 600 ml. water, then dried in air at 65° C. Dry weight=123 g.

(4) 110 g. of the above compound (1-acetylamino-2-ethoxy-6-naphthalenesulfonamide) was mixed with 500 ml. glacial acetic acid, 275 ml. water and 137 ml. concentrated hydrochloric acid. The material was refluxed at 103° C. for 2 hours. It was then diluted with 1500 ml. water, cooled to 10° C. and filtered. The wet presscake weighed 82.5 g. The material was dried to give 61.5 of the desired intermediate, 1-amino-2-ethoxy-6-naphthalenesulfonamide. (Additional 17 g. of material was obtained by adding 200 g. of salt to the filtrate above, filtering the precipitate and drying.)

B. Diazotization and coupling reactions: 4.85 g. (=1/69 mole) of 1-amino-2-ethoxy-6-naphthalenesulfonamide (79.4% active ingredient) was dissolved in 50 ml. water and 43.6 ml. 4% sodium hydroxide. There was added 28.0 ml. of 18.5% hydrochloric acid to make it acid to Congo paper, then the material was cooled to 0° C., 10.5 ml. of 9.94% sodium nitrite was added dropwise over a period of 1 hour, and the slurry was stirred for ½ hour after all the sodium nitrite had been added. Excess nitrite was then destroyed by the addition of 1.0 ml. of sulfamic acid solution (1 ml. NH$_2$SO$_3$H=0.557 ml. 9.94% NaNO$_2$).

A coupler solution was prepared by dissolving 5.32 g. (=1.1/69 mole) 1-(3'-sulfamylphenyl)-3-methyl-5-pyrazolone (75.8% active ingredient) in 20 ml. water and 20 ml. 4.0% sodium hydroxide, then cooling to 10° C.

The diazo was added to the coupler and 20 ml. 20% sodium carbonate (wt./vol.) was then added. Complete coupling occurred almost immediately. The slurry was stirred 1 hour, then filtered. The presscake was air dried at 65° C. Dry weight of dye=10.0 g.

C. Metallization of the dye: 10.0 g. of the above dye was slurried with 5.6 g. chromium formate paste and 100 ml. formamide. The mixture was heated at 165–170° C. for 5 hours. It was then cooled to room temperature, mixed with 300 ml. water and 100 g. salt, stirred 2 hours and filtered. The presscake was reslurried with 100 ml. water and refiltered. It was then dried overnight in air at 65° C. to give 8.5 g. dry dye.

8.5 g. of the above metallized dye was dispersed in a Werner-Pfleiderer mixer with 8.5 g. of the dispersing agent naphthalene-2-sodium sulfonate condensed with formaldehyde, to give 17 g. of dispersed product.

0.2 g. of the above dispersed product was dissolved in 300 ml. water, a 10 g. piece of woolen cloth was added and the cloth was agitated as the temperature was raised to 98° C. over a 45-minute period. The cloth was then further agitated for 1 hour at 98° C. in the dyebath, after which it was withdrawn, rinsed and dried. A pink shade was obtained which had very good light and washfastness.

Example 2

Preparation of the dye:

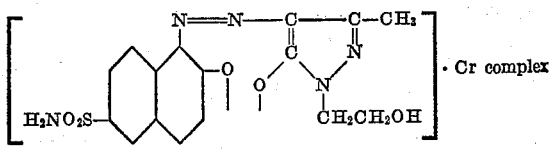 · Cr complex 4.85 g. of the intermediate of Example 1A (4) (1/69 mole; 79.4% active) was dissolved in 50 ml. water, 43.6 ml. 4% sodium hydroxide, 280 ml. 18.5% hydrochloric acid was added, then the slurry was cooled to 0° C. 10.5 ml. of 10% sodium nitrite was added and the material was stirred 1 hour to give complete diazotization. After this, excess sodium nitrite was destroyed by addition of 1.0 ml. of sulfamic acid solution (1 ml. sulfamic acid=0.557 ml. 1% sodium nitrite).

A coupler solution was prepared from 1.80 g. (=1.1/69 mole) of 1-(β-hydroxyethyl)-3-methyl-5-pyrazolone, 20 ml. water, and 20 ml. 4% sodium hydroxide, then cooled to 10° C. The diazo was added to the coupler and 30 ml. of 20% sodium carbonate was then added. Coupling was completed almost instantly. The material was filtered and the presscake air dried at 70° C. Dry weight of dye=8.0 g.

The above 8.0 g. of dye was slurried with 5.6 g. chromium formate paste (1.0/69 g. atom Cr) and 100 ml. formamide. The mixture was heated at 175° C. for 5 hours. It was then cooled to room temperature and poured into 200 ml. water and refiltered. It was then air dried at 65° C. to give 3.0 g. of chrome complex dye. Dispersion was carried out as in Example 1.

The above dispersed dye when applied to wool in the same manner as in Example 1 gave an orange-pink shade with very good light fastness but poorer wash fastness than the dye in Example 1.

Example 3

Preparation of the dye:

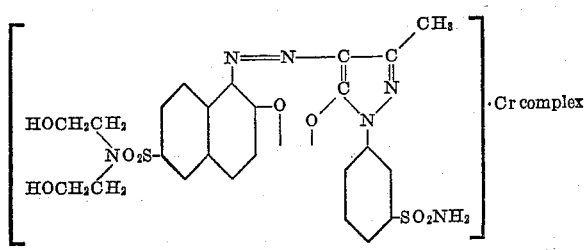 · Cr complex

A. Preparation of the intermediate:

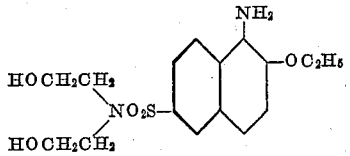

170 g. (0.52 mole) of 1-acetylamino-2-ethoxy-6-naphthalene-sulfonyl chloride, the dry powder product of Example 1A (2), was dissolved in 1 liter of acetone and cooled to —10° C. There was added dropwise 99.4 ml. (=1.04 mole) of diethanolamine over a 30 minute period. The material was stirred 45 minutes at —10° C. It was drowned in 3 liters of ice-water, then 500 g. salt was added, the resulting slurry was stirred for 3 hours, then filtered. The filter cake was washed with 2 liters 30% ice-cold salt solution, dried at 65° C. in air. Dry weight=237 g. The dry material was re-slurried with 1500 ml. water, refiltered, washed on the funnel with 500 ml. water, then air dried to give 140 g. of the compound:

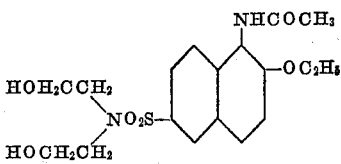

(=24.2/69 mole assumed 100%)

500 ml. glacial acetic acid, 275 ml. of water and 137 ml. concentrated hydrochloric acid was added to said compound, then the mixture was heated at reflux (106° C.) for 2 hours. The material was cooled to room temperature, then drowned in 1500 ml. water, salted out with 300 g. salt, stirred 2 hours, filtered and dried at 65° C. in air to give 159 g. dry powder (47% active material). The product was recrystallized from alcohol-water mixture to give 65 g. of material containing the desired intermediate (95% active).

B. Diazotization and coupling:

10.9 g. of the above intermediate (=1/69 mole) and 100 ml. 3.76% hydrochloric acid was mixed and cooled to 0° C. There was added dropwise over a ½ hour period with stirring 10.6 ml. 10% sodium nitrite to give excess nitrite. 0.5 ml. sulfamic acid was required to destroy excess nitrite after ½ hour additional stirring (1 ml. sulfamic acid=0.55 ml. 10% sodium nitrite).

A coupler solution was prepared by mixing 7.72 g. 1-(3'-sulfamylphenyl)-3-methyl-5-pyrazolone (=1.65/69 moles), 20 ml. water, and 20 ml. 4% sodium hydroxide, then cooled to 10° C. The diazo slurry was added to the coupler. Coupling was completed within 10 minutes, the material was filtered and air-dried at 65° C. Dry weight of dye=11 g.

C. Metallization of the dye:

11.0 g. of the above dye was slurried with 5.60 g. chromium formate paste (1/69 g. atom Cr) and 100 ml. formamide. The mixture was charged into a 250 ml. 3-necked flask, heated at 165-170° C. for 5 hours, cooled to room temperature. It was then poured into 300 ml. water, salted out with 100 g. salt, stirred overnight and filtered. The filter cake was reslurried with 100 ml. water, refiltered, and air dried at 65° C. to give 10.0 g. metallized dye. Dispersion was carried out as in Example 1.

The dye was applied to wool in the manner of Example 1 and gave a bluish pink shade with very good light and wash fastness.

Example 4

Preparation of the dye:

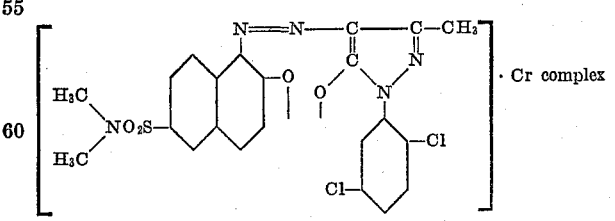 · Cr complex

This dye is prepared in the same manner as the dye of Example 3, using equimolar amounts of 1-acetyl-amino-2-methoxy-6-naphthalenesulfonyl chloride, dimethylamine, and 1-(2,5-dichlorophenyl)-3-methyl-5-pyrazolone in place of, respectively, the 1-acetylamino-2-ethoxy-6-naphthalenesulfonyl chloride, diethanolamine and 1-(3'-sulfamylphenyl)-3-methyl-5-pyrazolone in Example 3. Dispersion was carried out as in Example 1.

The dye was applied to nylon by the same dyeing process as in Example 1. A pink shade of excellent light and wash fastness was obtained.

Example 5

Preparation of the dye:

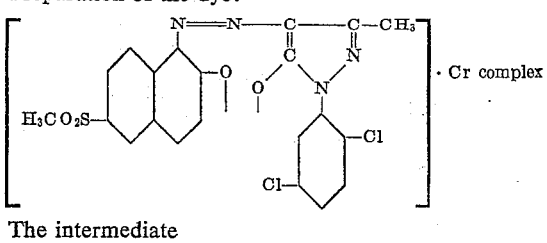 · Cr complex

The intermediate

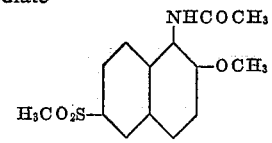

is prepared from the corresponding sulfonyl chloride as follows:

1 liter water, 328 g. sodium sulfite anhydrous, then 1500 ml. ice-water was added, cooled in ice to 20° C. Then 405 g. (1.3 moles) of 1-acetylamino-2-methoxy-6-naphthalenesulfonyl chloride was added. Then 612 cc. of 10% sodium hydroxide (wt./vol.) was added slowly, keeping the reaction always alkaline to brilliant yellow paper. Volume=3600 ml. 500 ml. 50% sulfuric acid and 300 g. salt were added (reaction mixture now in an 8 liter battery jar). The slurry was stirred 3 hours at 8° C. and filtered. The wet cake weighed 205 g. It was slurried in 500 ml. water and 230 ml. 20% $Na_2CO_3$ was added to bring pH to ca. 7. (pHydrion paper). The solution was evaporated to dryness by stirring in a beaker over a Bunsen burner. The material was broken in a mortar into small pieces and dried overnight in the vacuum oven at 80° C. Yield of material=225 g. dry compound of the formula:

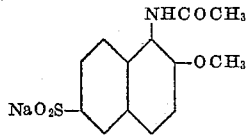

350 cc. absolute alcohol, 222 g. of the above compound, and 124 g. methyl iodide was mixed. The material was heated to reflux, then refluxed for 3 hours. During this time an additional 20 ml. of methyl iodide was added due to escape of methyl iodide. The product was then poured into 1000 ml. water. The material was separated by filtration after stirring 1 hour. The filter cake was washed on the funnel with 500 ml. water. Yield=250 g. wet cake. After drying at 65° C., the product weighed 135 g.

The latter product:

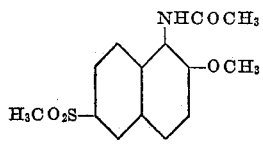

was hydrolyzed to the free amine:

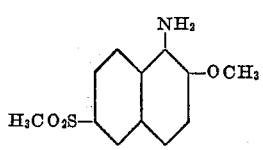

by the method of Example 1A (4).

Said free amine was diazotized in the same manner as the diazo component of Example 3, using equimolar amounts.

Coupling of the diazo to 1-(2',5'-dichlorophenyl)-3-methyl-5-pyrazolone was carried out also in the same manner as in Example 3, using equimolar amounts. Chroming also was carried out in the same manner and using equimolar proportions as in Example 3. A pink dyeing of excellent light and wash fastness on wool was obtained.

This invention has been disclosed with respect to certain preferred embodiments, and various modifications and variations thereof will become obvious to the person skilled in the art. It is to be understood that such modifications and variations are to be included within the spirit and purview of this application.

We claim:

1. A dyestuff selected from the group consisting of compounds devoid of carboxylic and sulfonic acid groups having the formula

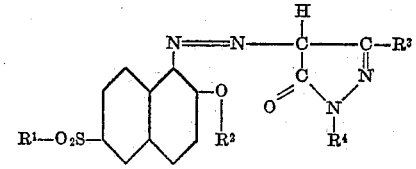

and the metal complexes of such compounds having the formula

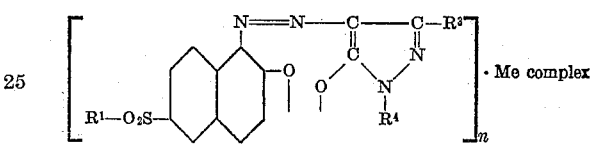

wherein $R^1$ is selected from the group consisting of lower alkyl, amino, monoalkylamino, dialkylamino, hydroxyalkylamino, and dihydroxyalkylamino; $R^2$ is lower alkyl; $R^3$ is selected from the group consisting of lower alkyl, carbalkoxy, and carbonamide; $R^4$ is selected from the group consisting of H, lower alkyl, lower hydroxyalkyl, lower cyanoalkyl, and monocyclic aromatic radicals; Me is a metal selected from the group consisting of chromium, nickel, and copper; and $n$ has a value of 1 to 2.

2. A metal complex of a compound as defined in claim 1, wherein Me is chromium.

3. A dyestuff having the formula

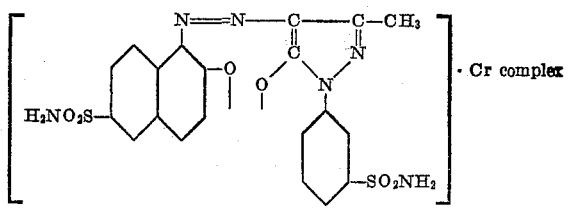

4. A dyestuff having the formula

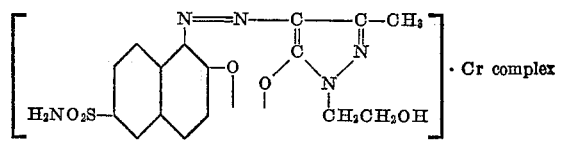

5. A dyestuff having the formula

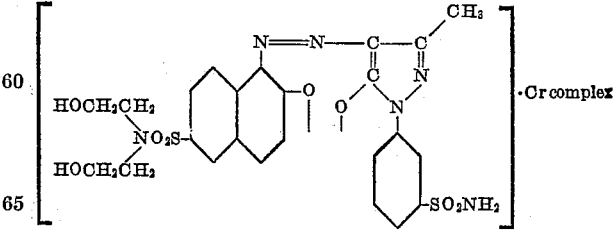

6. A dyestuff having the formula

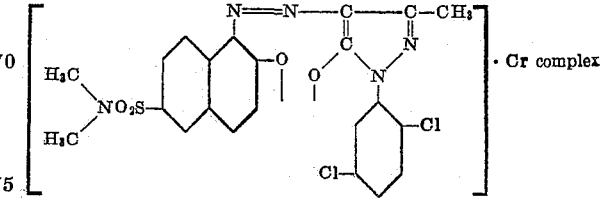

7. A dyestuff having the formula
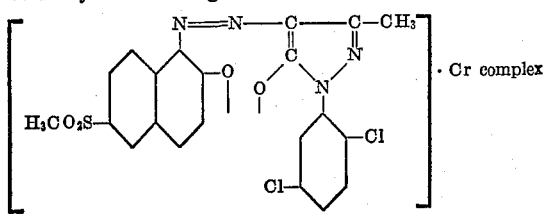 · Cr complex
References Cited in the file of this patent
UNITED STATES PATENTS
| | | |
|---|---|---|
| 1,529,995 | Fritzsche et al. | Mar. 17, 1925 |
| 2,033,341 | Krzikalla et al. | Mar. 10, 1936 |
| 2,537,098 | Slifkin et al. | Jan. 9, 1951 |
FOREIGN PATENTS
| | | |
|---|---|---|
| 408,590 | Great Britain | Mar. 29, 1934 |